United States Patent [19]

Izuti et al.

[11] Patent Number: 5,240,791
[45] Date of Patent: Aug. 31, 1993

[54] SOLID POLYMER ELECTROLYTE

[75] Inventors: Shyuiti Izuti; Tomohiko Noda; Hiroshi Imachi, all of Takatsuki, Japan

[73] Assignee: Yuasa Battery Co., Ltd., Osaka, Japan

[21] Appl. No.: 863,867

[22] Filed: Apr. 6, 1992

[51] Int. Cl.$^5$ ............................................. H01M 10/40
[52] U.S. Cl. ................................... 429/192; 252/62.2
[58] Field of Search ........................ 429/192; 252/62.2

[56] References Cited

U.S. PATENT DOCUMENTS 4,978,473 12/1990 Kuroda et al. .................. 429/192 X
5,030,527 7/1991 Carpio et al. ........................ 429/192

FOREIGN PATENT DOCUMENTS 60-47372 3/1985 Japan .................................... 429/192

2119162 11/1983 United Kingdom ................. 429/192

Primary Examiner—Stephen Kalafut
Attorney, Agent, or Firm—Armstrong, Westerman, Hattori, McLeland & Naughton

[57] ABSTRACT

A primary invention is a solid polymer electrolyte including an ionic salt and a compound able to dissolve the ionic salt and having a crosslink network structure. A crosslink network structure is formed by polymerizing a two-functional acryloyl compound having two acryloyl groups with a one-functional acryloyl compound having one acryloyl group. In this solid polymer electrolyte, the crosslink network structure has a skeleton in which the one-functional acryloyl compound spreads into branches. Since molecular movement of this branched skeleton is active, its flexibility is improved.

13 Claims, No Drawings

SOLID POLYMER ELECTROLYTE

BACKGROUND OF THE INVENTION

This invention relates to a solid polymer electrolyte for use in electro-chemical devices such as a primary battery, a secondary battery, an electro-chromic display, an electro-chemical sensor, an iontophoresis, a condenser and others.

A solid polymer electrolyte having a crosslink network structure is well known. This crosslink network structure has been formed by using polyethylene glycol or polyether including a molecular weight of smaller than 2,000. The polyethylene glycol has a high ability to dissolve alkaline metal salt, but has a defect that it is liable to crystallize. Further, a solid polymer electrolyte having a structure formed by denaturing and cross-linking the above polyethylene glycol and polyether into ester diacrylate or ester dimethacrylate has the defect that they are inflexible and very brittle. For this reason, it is apt to be broken by an external force to cause short-circuiting, etc. when used in a battery. Especially, the flexibility will be worsened as the molecular weight of polyethylene glycol becomes small. Polyethylene glycols having a molecular weight of smaller than 2,000 have so far been used, and especially those having a molecular weight ranging from 200 to 1,000 have been used in order to avoid crystallizing. Therefore, the defect of poor flexibility has been remarkable.

SUMMARY OF THE INVENTION

An object of this invention is to provide a solid polymer electrolyte having a good flexibility, i.e. excellent mechanical properties, and including a high ionic conductivity.

A first embodiment of the invention provides a solid polymer electrolyte including an ionic salt and a compound able to dissolve the ionic salt and having a crosslink network structure. The crosslink network structure is formed by polymerizing a two-functional acryloyl compound having two acryloyl groups with a one-functional acryloyl compound having one acryloyl group.

In this embodiment, the crosslink network structure has a skeleton in which the one-functional acryloyl compound spreads into branches. Since molecular movement of this branched skeleton is active, flexibility is improved.

A second embodiment of the invention provides a solid polymer electrolyte including an ionic salt and a compound able to dissolve the ionic salt and having a crosslink network structure. The crosslink network structure here is formed by polymerizing a two-functional acryloyl compound having two acryloyl groups, the two-functional acryloyl compound is an ester diacrylate or ester dimethacrylate of polyethylene glycol, and the polyethylene glycol is one having a molecular weight ranging from 2,000 to 30,000.

A third embodiment of the invention provides a solid polymer electrolyte including an ionic salt and a compound able to dissolve the ionic salt and having a crosslink network structure. The crosslink network structure here is formed by polymerizing a two-functional acryloyl compound having two acryloyl groups, the two-functional acryloyl compound is ester diacrylate or ester dimethacrylate of copolymer of ethylene oxide and propylene oxide, and the copolymer is one having a molecular weight ranging from 2,000 to 30,000.

The molecular weight of polyethylene glycol or copolymer is limited to within a range of 2,000 to 30,000 in the second and third embodiments, so that the flexibility is improved.

DETAILED DESCRIPTION OF THE INVENTION

In the first embodiment of the invention, the solid polymer electrolyte includes the ionic salt and the compound able to dissolve the ionic salt and has the crosslink network structure. The crosslink network structure is formed by polymerizing the two-functional acryloyl compound having two acryloyl groups with the one-functional acryloyl compound having one acryloyl group.

A primary feature of the first embodiment is the use of the one-functional acryloyl compound having one acryloyl group.

Ester monoacrylate or ester monomethacrylate of polyether without active hydrogen on the end of chain is used for the one-functional acryloyl compound. Further, diethylene glycol, polyethylene glycol, polypropylene glycol, or copolymer of ethylene oxide and propylene oxide, is used for the polyether.

(a) Either ester diacrylate or ester dimethacrylate of polyethylene glycol, or (b) ester diacrylate or ester dimethacrylate of copolymer of ethylene oxide and methylene oxide unit, is used for the two-functional acryloyl compound.

In the above (b), the copolymer may be either a random copolymer or block copolymer. Methylene oxide unit has a mole content of under 30 mole percent incl. is preferably used for the copolymer. This is to keep a balance between a decrease in crystallinity and a solubility of ionic salt. Further, there is preferably used a copolymer having a molecular weight ranging from 2,000 to 30,000, and especially that ranging from 2,000 to 5,000. The reason is as follows. The flexibility, i.e. the mechanical property, is improved when the molecular weight of copolymer is increased. However, when the molecular weight is increased excessively the reactivity is weakened so as to worsen productivity, and the copolymer is liable to crystallize so that the ionic conductivity is lowered. Moreover, when the molecular weight is smaller than 2,000, tensile strength is lessened to induce a problem in practical use.

In the above (a), there is preferably used a copolymer having a molecular weight ranging from 2,000 to 30,000. The reason is same as the case of copolymer (b) described above.

In the second embodiment of the invention, the solid polymer electrolyte includes the ionic salt and the compound able to dissolve the ionic salt and has the crosslink network structure, the crosslink network structure is formed by polymerizing the two-functional acryloyl compound having two acryloyl groups, the two-functional acryloyl compound is ester diacrylate or ester dimethacrylate of polyethylene glycol, and the polyethylene glycol is one having a molecular weight ranging from 2,000 to 30,000.

When the molecular weight of polyethylene glycol ranges from 2,000 to 30,000, a solid polymer electrolyte which is excellent in ionic conductivity, flexibility and tensile strength, can be prepared from the same reason as described above.

In the third embodiment of the invention, the solid polymer electrolyte includes the ionic salt and the compound able to dissolve the ionic salt and has the crosslink network structure, the crosslink network structure is formed by polymerizing two-functional acryloyl compound having two acryloyl groups, the two-functional acryloyl compound is ester diacrylate or ester dimethacrylate of copolymer of ethylene oxide and propylene oxide, and the copolymer is one having a molecular weight ranging from 2,000 to 30,000.

When the molecular weight of copolymer ranges from 2,000 to 30,000, a solid polymer electrolyte which is excellent in ionic conductivity, flexibility and tensile strength, can be prepared from the same reason as described above. The copolymer may be either a random copolymer or block copolymer. Propylene oxide including a mole content of under 30 mole percent incl. is preferably used for the copolymer. This is to keep a balance between a decrease in crystallinity and a solubility of ionic salt.

In all the above embodiments, the polymerization for constructing the crosslink network structure is carried out by heating, irradiation of active light such as ultraviolet light for instance, or irradiation of ionizing radiation such as electron beam.

All the electrolytes of the above embodiments include a compound able to dissolve the ionic salt (abbreviated to "solvent" hereunder). When the solvent is included in the solid polymer electrolyte, the ionic conductivity is improved. In this case, it becomes possible to include a large quantity of solvent when the molecular weight of polyether becomes large. Therefore, the increase of molecular weight is not only effective for the improvement in ionic conductivity but the decrease in strength of crosslink network structure swelled with the solvent.

In all the electrolytes of the above inventions; $LiClO_4$, $LiBF_4$, $LiAsF_6$, $LiCF_3SO_3$, $LiPF_6$, $LiI$, $LiBr$, $LiSCN$, $NaI$, $Li_2B_{10}Cl_{10}$, $LiCF_3CO_2$, $NaBr$, $NaSCN$, $KSCN$, $MgCl_2$, $Mg(ClO_4)_2$, $(CH_3)_4$, $NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$ and $(n-C_5H_{11})_4NI$ are preferably used for the ionic salt. However, the ionic salt is not limited to these compounds.

As the compound able to dissolve the ionic salt, there are tetrahydrofuran; 2-methyl-tetrahydrofuran; 1,3-dioxoran, 4,4-dimethyl-1,3-dioxane; γ-butyrolactone; ethylene carbonate; propylene carbonate; butylene carbonate; sulfolane; 3-methyl sulfolane tert.-butyl ether; iso-butyl ether; 1,2-dimethoxy ethane; 1,2-ethoxy methoxy ethane; methyl digrime; methyl trigrime; methyl tetragrime; ethyl grime; ethyl digrime or a mixture of them. However, the compound is not limited to these components.

As described above, all of the embodiments can provide the solid polymer electrolytes having good flexibility, i.e. excellent mechanical properties, and high ionic conductivity.

Examples of the inventions will be described hereunder in detail. Examples 1 through 12 relate to the first embodiment, Examples 13 through 17 relate to the second embodiment, and Examples 18 through 22 relate to the third embodiment.

EXAMPLE 1

5 weight parts of ester diacrylate of polyethylene glycol (mean molecular weight: 520), 5 weight parts of ester monomethacrylate of polyethylene glycol (mean molecular weight: 490), 1.3 weight parts of lithium trifluoromethane-sulfolate and 1 weight part of benzophenone were mixed uniformly and dissolved in 10 weight parts of propylene carbonate. The mixture was cast on a glass plate and ultraviolet beam was irradiated on it using a UV lamp of IKW for 10 seconds from a 15 cm distant position, so that a film having a thickness of 100 microns was prepared.

The ionic conductivity of this film was $6.0 \times 10^{-4}$ $Scm^{-1}$ at a temperature of 25° C. when measured by a complex impedance method.

This film was bent on stainless bars of various diameters, and the resistance to film cracking was evaluated in respect of the diameter of stainless bar. The film cracked when applied on a bar of 3.0 mm diameter.

The film as described below was prepared for comparison. 10 weight parts of ester diacrylate of polyethylene glycol (mean molecular weight: 520), 1.3 weight parts of lithium trifluoromethane-sulfolate and 1 weight part of benzophenone were mixed uniformly and dissolved in 10 weight parts of propylene carbonate. The mixture was cast on a glass plate and ultraviolet beam was irradiated on it in the same way as above, so that a film having a thickness of 100 microns was prepared. The ionic conductivity and strength of this film was measured in the same way. The conductivity was $8.0 \times 10^{-4}$ $Scm^{-1}$ at a temperature of 25° C. The film cracked when applied on a bar of 5.0 mm diameter.

As described above, the film comprising the solid polymer electrolyte of this example includes good ionic conductivity and has a superior flexibility, i.e. mechanical property.

EXAMPLE 2

5 weight parts of ester dimethacrylate of polyethylene glycol (mean molecular weight: 540), 5 weight parts of ester monoacrylate of polyethylene glycol (mean molecular weight: 470), 1.3 weight parts of lithium trifluoromethane-sulfolate and 1 weight part of benzophenone were mixed uniformly and dissolved in 10 weight parts of propylene carbonate. The mixture was cast on a glass plate and ultraviolet beam was irradiated on it using a UV lamp of 1 KW for 40 seconds from a 15 cm distant position, so that a film having a thickness of 100 microns was prepared.

The ionic conductivity and strength of this film were measured in the same way as in Example 1. The ionic conductivity was $6.0 \times 10^{-4}$ $Scm^{-1}$ at a temperature of 25° C., and the film cracked when applied on the bar of 3.0 mm diameter.

EXAMPLE 3

A film having a thickness of 100 microns was prepared having the same composition as that of Example 1, other than the following two points: a) benzophenone was not used and b) an electron beam of 2.5 Mrad was used in place of the ultraviolet beam of Example 1.

The ionic conductivity and strength of this film were measured in the same way as in Example 1. The ionic conductivity was $6.0 \times 10^{-4}$ $Scm^{-1}$ at a temperature of 25° C., and the film cracked when applied on the bar of 3.0 mm diameter.

EXAMPLE 4

A liquid which included 100 weight parts of methylethylketone mixed with 9.5 weight parts of lithium perchlorate, was added and mixed to a liquid which comprised 70 weight parts of a random copolymer of ester dimethacrylate (including 20 mole percent of methylene oxide, molecular weight: 4,000) of ethylene oxide and methylene oxide unit added to and mixed uniformly with 30 weight parts of ester monomethacrylate (molecular weight: 400) of methoxylation polyethylene glycol. This mixed liquid was cast on a glass plate and the methyl-ethyl-ketone was evaporated. Then, 6 Mrad electron beam was irradiated on it to stiffen and prepare a film having a thickness of 100 microns.

The ionic conductivity of this film was $1 \times 10^{-5}$ Scm$^{-1}$ at a temperature of 25° C. when measured by the complex impedance method.

90° bending test and 180° bending test were carried out in order to examine the flexibility. This film did not crack in either of the tests.

Several films having a thickness of 100 microns were prepared in the same way, using the foregoing random copolymers (including 20 mole percent of methylene oxide) having molecular weights of 400, 1,000, 2,000, 4,000 and 10,000, respectively.

Ionic conductivities and results of bending tests of the prepared films are listed in Table 1.

TABLE 1

| Molecular weight | Ionic conductivity (Scm$^{-1}$) | 90° bending test | 180° bending test |
|---|---|---|---|
| 400 | $1 \times 10^{-6}$ | Cracked | Cracked |
| 1,000 | $1 \times 10^{-5}$ | Cracked | Cracked |
| 2,000 | $2 \times 10^{-5}$ | Not cracked | Not cracked |
| 4,000 | $1 \times 10^{-5}$ | Not cracked | Not cracked |
| 10,000 | $8 \times 10^{-6}$ | Not cracked | Not cracked |

It can be understood from Table 1 that the flexibility is improved as the molecular weight of copolymer increases.

EXAMPLE 5

Propylene carbonate was used in place of the methyl-ethyl-ketone of Example 4. This propylene carbonate was left in the film without being evaporated, so that a film having a thickness of 100 microns was prepared in the same way as Example 4 other than the above details.

Ionic conductivities and results of bending tests of prepared films are listed in Table 2.

TABLE 2

| Molecular weight | Ionic conductivity (Scm$^{-1}$) | 90° bending test | 180° bending test |
|---|---|---|---|
| 400 | $2 \times 10^{-4}$ | Cracked | Cracked |
| 1,000 | $2 \times 10^{-4}$ | Cracked | Cracked |
| 2,000 | $3 \times 10^{-4}$ | Not cracked | Not cracked |
| 4,000 | $5 \times 10^{-4}$ | Not cracked | Not cracked |
| 10,000 | $1 \times 10^{-3}$ | Not cracked | Not cracked |

EXAMPLE 6

A random copolymer having a molecular weight of 4,000 was used, in which the ester dimethacrylate of Example 5 was replaced by ester diacrylate. A film having a thickness of 100 microns was prepared in the same way as Example 5 other than the above detail.

The ionic conductivity of this film was $4.5 \times 10^{-4}$ Scm$^{-1}$ at a temperature of 25° C. when measured by the complex impedance method. As for the flexibility, the film did not crack in both the 90° bending test and 180° bending test.

EXAMPLE 7

100 weight parts of propylene carbonate solution including 11.5 weight percent of LiCF$_3$SO$_3$ were added to and mixed uniformly with a liquid composed of 50 weight parts of ester diacrylate (molecular weight: 4,000) of polyethylene glycol mixed with 50 weight parts of ester monoacrylate of methoxylation deithylene glycol. This mixture was cast on a glass plate and was irradiated by an electron beam of 6 Mrad, so that a film having a thickness of 100 microns was prepared.

The ionic conductivity of this film was $3 \times 10^{-4}$ Scm$^{-1}$ at a temperature of 25° C. when measured by the complex impedance method. As for the flexibility, this film did not crack even in the 180° bending test.

Several films having a thickness of 100 microns were prepared in the same way by using ester diacrylate of polyethylene glycols having molecular weights of 400, 1,000, 2,000 and 10,000, respectively.

Ionic conductivities and results of bending tests of prepared films are listed in Table 3.

TABLE 3

| Molecular weight | Ionic conductivity (Scm$^{-1}$) | 90° bending test | 180° bending test |
|---|---|---|---|
| 400 | $1 \times 10^{-4}$ | Cracked | Cracked |
| 1,000 | $1 \times 10^{-4}$ | Cracked | Cracked |
| 2,000 | $2 \times 10^{-4}$ | Not cracked | Cracked |
| 4,000 | $3 \times 10^{-4}$ | Not cracked | Not cracked |

EXAMPLE 8

Dimethoxy ethane was used in place of the propylene carbonate of Example 7. The dimethoxy ethane was cast on a glass plate and then evaporated, so that a film having a thickness of 100 microns was prepared in the same way as the Example 7 other than the above detail. The molecular weight of the ester diacrylate of polyethylene glycol was 4,000.

The ionic conductivity of this film was $7 \times 10^{-6}$ SCM$^{-1}$ at a temperature of 25° C. when measured by the complex impedance method. As for the flexibility, this film did not crack even in the 180° C. bending test.

Several films having a thickness of 100 microns were prepared in the same way by using ester diacrylate of polyethylene glycols having molecular weights of 400, 1,000, 2,000 and 10,000, respectively.

Ionic conductivities and results of bending tests of prepared films are listed in Table 4.

TABLE 4

| Molecular weight | Ionic conductivity (Scm$^{-1}$) | 90° bending test | 180° bending test |
|---|---|---|---|
| 400 | $3 \times 10^{-6}$ | Cracked | Cracked |
| 1,000 | $2 \times 10^{-5}$ | Cracked | Cracked |
| 2,000 | $3 \times 10^{-5}$ | Not cracked | Cracked |
| 4,000 | $7 \times 10^{-6}$ | Not cracked | Not cracked |
| 10,000 | $5 \times 10^{-6}$ | Not cracked | Not cracked |

EXAMPLE 9

In place of the electron beam radiation of Example 8, 5 weight parts of azobis isobutyro nitrile were added to the solution of Example 8 and it reacted at a temperature of 80° C. for one hour. A film having a thickness of 100 microns was prepared in the same way as Example 8 other than this detail. The molecular weight of the used ester diacrylate of polyethylene glycol was 4,000.

The ionic conductivity of this film was $7 \times 10^{-6}$ Scm$^{-1}$ at a temperature of 25° C. when measured by the complex impedance method. As for the flexibility, this film did not crack even in the 180° bending test.

EXAMPLE 10

In place of the electron beam radiation of Example 8, 2 weight parts of benzophenone and 2 weight parts of triethylamine were added to the Example 8 solution, and ultraviolet beam was irradiated on it using a mercury lamp of 1 KW for 30 seconds from a 15 cm distant position. A film having a thickness of 100 microns was prepared in the same way as Example 8 other than these details. The molecular weight of the ester diacrylate of polyethylene glycol was 4,000.

The ionic conductivity of this film was $7\times10^{-6}$ Scm$^{31}$ $^1$ at a temperature of 25° C. when measured by the complex impedance method. As for the flexibility, this film did not crack even in the 180° bending test.

EXAMPLE 11

Ester diamethaorylate (molecular weight: 4,000) of polyethylene glycol was used in place of the ester diacrylate of polyethylene glycol of Example 7, so that a film having a thickness of 100 microns was prepared in the same way as in Example 7 other than this point.

The ionic conductivity of this film was $5\times10^{-4}$ Scm$^{-1}$ at a temperature of 25° C. when measured by the complex impedance method. As for the flexibility, the film did not crack even in the 180° bending test.

EXAMPLE 12

100 weight parts of propylene carbonate solution including 11.5 weight percent of LiCF$_3$SO$_3$ were added to and mixed uniformly with a liquid made by mixing 50 weight parts of ester dimethacrylate (molecular weight: 4,000) of polyethylene glycol with 50 weight parts of copolymer (including 20 mole percent of propylene oxide, molecular weight: 400) of monomethoxylation ethylene oxide and propylene oxide. This mixed liquid was cast on a glass plate and electron beam of 6 Mrad was irradiated on it, so that a film having a thickness of100 microns was prepared.

The ionic conductivity of this film was $6\times10^{-4}$ Scm$^{-1}$ at a temperature of 25° C. when measured by the complex impedance method. As for the flexibility, this film did not crack even in the 180° bending test.

EXAMPLE 13

100 weight parts of propylene carbonate solution including 11.5 weight percent of LiCF$_3$SO$_3$ were added to and mixed uniformly with 100 weight parts of ester dimethacrylate (molecular weight: 4,000) of polyethylene glycol. This mixed liquid was cast on a glass plate and electron beam of 10 Mrad was irradiated on it, so that a film having a thickness of 100 microns was prepared.

The ionic conductivity of this film was $3\times10^{-4}$ Scm$^{-1}$ at a temperature of 25° C. when measured by the complex impedance method. As for the flexibility, this film did not crack in the 90° bending test.

Several films having a thickness of 100 microns were prepared in the same way by using ester dimethaorylate of polyethylene glycols having molecular weights of 400, 1,000, 2,000 and 10,000, respectively.

Ionic conductivities and results of bending tests of prepared films are listed in Table 5.

TABLE 5

| Molecular weight | Ionic conductivity (Scm$^{-1}$) | 90° bending test | 180° bending test |
| --- | --- | --- | --- |
| 400 | $1 \times 10^{-4}$ | Cracked | Cracked |
| 1,000 | $1 \times 10^{-4}$ | Cracked | Cracked |
| 2,000 | $2 \times 10^{-4}$ | Not cracked | Cracked |
| 4,000 | $3 \times 10^{-4}$ | Not cracked | Cracked |
| 10,000 | $4 \times 10^{-4}$ | Not cracked | Not cracked |

EXAMPLE 14

Dimethoxy-ethane was in place of the propylene carbonate of Example 13. The dimethoxy-ethane solution was cast on a glass plate and then evaporated, so that a film having a thickness of 100 microns was prepared in the same way as in Example 14 other than this detail. The molecular weight of the used ester dimethacrylate of polyethylene glycol was 4,000.

The ionic conductivity of this film was $3\times10^{-6}$ Scm$^{-1}$ at a temperature of 25° C. when measured by the complex impedance method. As for the flexibility, this film did not crack in the 90° bending test.

Several films having a thickness of 100 microns were prepared in the same way by using ester dimethacrylate of polyethylene glycols having molecular weights of 400, 1,000, 2,000, and 10,000, respectively.

Ionic conductivities and results of bending tests of prepared films are listed in Table 6.

TABLE 6

| Molecular weight | Ionic conductivity (Scm$^{-1}$) | 90° bending test | 180° bending test |
| --- | --- | --- | --- |
| 400 | $1 \times 10^{-6}$ | Cracked | Cracked |
| 1,000 | $1 \times 10^{-5}$ | Cracked | Cracked |
| 2,000 | $8 \times 10^{-5}$ | Not cracked | Cracked |
| 4,000 | $3 \times 10^{-6}$ | Not cracked | Cracked |
| 10,000 | $1 \times 10^{-6}$ | Not cracked | Not cracked |

EXAMPLE 15

In place of the electron beam radiation of Example 14, 5 weight parts of azobis isobutyro nitrile were added to the solution of Example 14 and it reacted at a temperature of 80° C. for one hour. A film having a thickness of 100 microns was prepared in the same way as Example 14 other than this detail. The molecular weight of the used ester dimethacrylate of polyethylene glycol was 4,000.

The ionic conductivity of this film was $3\times10^{-6}$ Scm$^{-1}$ a a temperature of 25° C. when measured by the complex impedance method. As for the flexibility, this film did not crack in the 90° bending test.

EXAMPLE 16

In place of the electron beam radiation of Example 14, 2 weight parts of benzophenone and 2 weight parts of triethylamine were added to the Example 14 solution, and ultraviolet beam was irradiated on it using a mercury lamp of 1 KW for 30 seconds from a 15 cm distant position. A film having a thickness of 100 microns was prepared in the same way as Example 14 other than these details. The molecular weight of the ester dimethacrylate of polyethylene glycol was 4,000.

The ionic conductivity of this film was $3\times10^{-6}$ Scm$^{-1}$ at a temperature of 25° C. when measured by the complex impedance method. As for the flexibility, this film did not crack in the 90° bending test.

EXAMPLE 17

Ester diacrylate (molecular weight: 4,000) was used in place of the ester dimethacrylate of Example 13. A film having a thickness of 100 microns was prepared in the same way as Example 13 other than this point.

The ionic conductivity of this film was $2 \times 10^{-4}$ Scm$^{-1}$ at a temperature of 25° C. when measured by the complex impedance method. As for the flexibility, the film did not crack in the 90° bending test.

EXAMPLE 18

A liquid including 9.5 weight parts of lithium perchlorate mixed with 100 weight parts of dimethoxyethane, was added to 100 weight parts of a ester dimethacrylate copolymer (including 20 mole percent of propylene oxide, molecular weight: 4,200) of ethylene oxide and propylene oxide. 2 weight parts of benzophenone and 2 weight parts of triethylamine were added to and mixed with the above liquid. The mixed liquid was cast on a glass plate and the dimethoxyethane was evaporated. Then, ultraviolet beam was irradiated on it using an ultraviolet lamp of 1 KW for 30 seconds from a 15 cm distance position in an argon atmosphere, so that a film having a thickness of 100 microns was prepared.

The ionic conductivity of this film was $6 \times 10^{-6}$ Scm$^{-1}$ at a temperature of 25° C. when measured by the complex impedance method. As for the flexibility, this film did not crack even in the 180° bending test.

Several films having a thickness of 100 microns were prepared in the same way by using ester dimethacrylate of copolymers (including 20 moles percent of propylene oxide) of ethylene oxide and propylene oxide having molecular weights of 450, 1,100, 2,100 and 10,000, respectively.

Ionic conductivities and results of bending tests of prepared films are listed in Table 7.

TABLE 7

| Molecular weight | Ionic conductivity (Scm$^{-1}$) | 90° bending test | 180° bending test |
| --- | --- | --- | --- |
| 450 | $5 \times 10^{-6}$ | Cracked | Cracked |
| 1,100 | $1 \times 10^{-5}$ | Cracked | Cracked |
| 2,100 | $8 \times 10^{-5}$ | Not cracked | Cracked |
| 4,200 | $6 \times 10^{-6}$ | Not cracked | Not cracked |
| 10,000 | $3 \times 10^{-6}$ | Not cracked | Not cracked |

EXAMPLE 19

5 weight parts of azobis isobutyro nitrile were used in place of 2 weight parts of benzophenone and heated at a temperature of 80° C. for one hour in place of the ultraviolet beam radiation of Example 18. A film having a thickness of 100 microns were prepared in the same way as in Example 18 other than these details.

The ionic conductivity of this film was $6 \times 10^{-6}$ Scm$^{-1}$ at a temperature of 25° C. when measured by the complex impedance method. As for flexibility, this film did not crack even in the 180° bending test.

EXAMPLE 20

A liquid made of 9.5 weight parts of lithium perchlorate mixed with 100 weight parts of propylene carbonate, was added to 100 weight parts of an ester dimethacrylate copolymer (including 20 mole percent of propylene oxide, molecular weight: 4,200) of ethylene oxide and propylene oxide. 2 weight parts of benzophenone were added to and mixed with the above liquid. The mixed liquid was cast on a glass plate. Then, ultraviolet beam was irradiated on it using an ultraviolet lamp of 1 KW for 30 second from a 15 cm distance position in an argon atmosphere, so that a film having a thickness of 100 microns was prepared.

Several films having a thickness of 100 microns were prepared in the same way by using ester dimethacrylate of copolymers (including 20 mole percent of propylene oxide) of ethylene oxide and propylene oxide having molecular weights of 450, 1,100, 2,100 and 10,000, respectively.

Ionic conductivities and results of being tests of prepared films are listed in Table 8.

TABLE 8

| Molecular weight | Ionic conductivity (Scm$^{-1}$) | 90° bending test | 180° bending test |
| --- | --- | --- | --- |
| 450 | $1 \times 10^{-4}$ | Cracked | Cracked |
| 1,100 | $1 \times 10^{-4}$ | Cracked | Cracked |
| 2,100 | $2 \times 10^{-4}$ | Not cracked | Cracked |
| 4,200 | $3 \times 10^{-4}$ | Not cracked | Not cracked |
| 10,000 | $4 \times 10^{-4}$ | Not cracked | Not cracked |

EXAMPLE 21

The same composition as in Example 20 was used other than that the benzophenone was not used. An electron beam of 10 Mrad was used instead of the ultraviolet radiation of Example 20, so that a film having a thickness of 100 microns was prepared. The molecular weight of the copolymer of ethylene oxide and propylene oxide was 4,200.

The ionic conductivity of this film was $2 \times 10^{-4}$ Scm$^{-1}$ at a temperature of 25° C. when measured by the complex impedance method. As for the flexibility, this film did not crack even in the 180° bending test.

EXAMPLE 22

A liquid, made of 9.5 weight parts of lithium perchlorate mixed with 100 weight parts of propylene carbonate, was added to 100 weight parts of an ester diacrylate copolymer (including 20 mole percent of propylene oxide, molecular weight: 4,200) of ethylene oxide and propylene oxide. The mixed liquid was cast on a glass plate. Then, an electron beam of 5 Mrad was irradiated on it in an argon atmosphere, so that a film having a thickness of 100 microns was prepared.

The ionic conductivity of this film was $2 \times 10^{-4}$ Scm$^{-1}$ at a temperature of 25° C. when measured by the complex impedance method. As for the flexibility, this film did not crack even in the 180° bending test.

What is claimed is:

1. A solid polymer electrolyte comprising an ionic salt and a compound able to dissolve the ionic salt and having a crosslinked network structure, wherein the crosslinked network structure is formed by polymerizing a first acryloyl compound having two acryloyl groups with a second acryloyl compound having one acryloyl group.

2. A solid polymer electrolyte as set forth in claim 1, wherein the first acryloyl compound is ester diacrylate or ester dimethacrylate of polyethylene glycol, and the second acryloyl compound is ester monoacrylate or ester monomethacrylate of polyethylene glycol without an active hydrogen at its chain end.

3. A solid polymer electrolyte as set forth in claim 1, wherein the first acryloyl compound is ester diacrylate or ester dimethacrylate copolymer of ethylene oxide and methylene oxide unit, and the second acryloyl compound is ester monoacrylate or ester monomethacrylate of polyether without an active hydrogen at its chain end.

4. A solid polymer electrolyte as set forth in claim 3, wherein the copolymer has a content of the methylene oxide unit of less than or equal to 30 mole percent.

5. A solid polymer electrolyte as set forth in claim 3, wherein the copolymer has a molecular weight ranging from 2,000 to 30,000.

6. A solid polymer electrolyte as set forth in claim 1, wherein the first acryloyl compound is ester diacrylate or ester dimethacrylate of polyethylene glycol, and the second acryloyl compound is ester monoacrylate or ester monomethacrylate of polyether without an active hydrogen at its chain end.

7. A solid polymer electrolyte as set forth in claim 6, wherein the polyethylene glycol has a molecular weight ranging from 2,000 to 30,000.

8. A solid polymer electrolyte as set forth in claim 3 or claim 6, wherein the polyether is diethylene glycol, polyethylene glycol, polypropylene glycol, or a copolymer of ethylene oxide and propylene oxide.

9. A solid polymer electrolyte comprising an ionic salt and a compound able to dissolve the ionic salt and having a crosslinked network structure, wherein the crosslinked network structure is formed by polymerizing an acryloyl compound having two acryloyl groups, the acryloyl compound being ester diacrylate or ester dimethacrylate of polyethylene glycol, and the polyethylene glycol has a molecular weight ranging from 2,000 to 30,000.

10. A solid polymer electrolyte comprising an ionic salt and a compound able to dissolve the ionic salt and having a crosslinked network structure, wherein the crosslinked network structure is formed by polymerizing an acryloyl compound having two acryloyl groups, the acryloyl compound being ester diacrylate or ester dimethacrylate copolymer of ethylene oxide and propylene oxide, and the copolymer has a molecular weight ranging from 2,000 to 30,000.

11. A solid polymer electrolyte as set forth in claim 10, wherein the copolymer has a content of propylene oxide of less than or equal to 30 mole percent.

12. A solid polymer electrolyte as set forth in claim 3 or claim 10, wherein the copolymer is a random copolymer or a block copolymer.

13. A solid polymer electrolyte as set forth in claim 1, claim 9 or claim 10, wherein the polymerization is carried out by heating, irradiation with ultraviolet radiation, or irradiation with an electron beam.

* * * * *